United States Patent

Carter et al.

[15] 3,705,357

[45] Dec. 5, 1972

[54] MORPHIC EXCLUSIVE-OR CIRCUITS

[72] Inventors: William C. Carter, Ridgefield, Conn.; Donald C. Jessep, Jr., Poundridge; Aspi B. Wadia, Chappaqua, both of N.Y.

[73] Assignee: International Business Machines Coporation, Armonk, N.Y.

[22] Filed: March 23, 1971

[21] Appl. No.: 127,114

[52] U.S. Cl. ......................328/93, 307/216, 328/159

[51] Int. Cl. ..........................H03k 19/32, H03k 19/38

[58] Field of Search .................328/93, 159; 307/216

[56] References Cited

UNITED STATES PATENTS 2,831,987 4/1958 Jones, Jr. ..............................307/216

3,093,751 6/1963 Williamson .......................307/216 X

*Primary Examiner*—John Zazworsky

*Attorney*—Hanifin & Jancin and Roy S. Schlemmer, Jr.

[57] ABSTRACT

The present invention relates to a logic circuit for testing the condition of a set of self-testing logic variables. More specifically, it relates to such a logic circuit for forming an Exclusive-Or function on such variables. The circuit has particular utility in high reliability systems for checking the conditions of a plurality of line pairs wherein each line pair constitutes a morphic self-testing variable and wherein the circuit output is itself a morphic self-testing function.

7 Claims, 6 Drawing Figures

INVENTORS
WILLIAM C. CARTER
DONALD C. JESSEP, JR.
ASPI B. WADIA

BY

ATTORNEY

MORPHIC EXCLUSIVE-OR CIRCUITS

CROSS-REFERENCE TO RELATED APPLICATIONS

Copending application Ser. No. 125,652 filed Mar. 18, 1971 entitled ERROR-FREE DECODING FOR FAILURE-TOLERANT MEMORIES, of W.C. Carter, R.A. Henle, D.C. Jessep, Jr. and A.B. Wadia discloses a memory system wherein one of the final checking circuits may incorporate a modified morphic Exclusive-OR circuit such as disclosed herein. Application Ser. No. 837,596 of W.C. Carter and P.R. Schneider, filed June 30, 1969, entitled SYSTEM USE OF SELF-TESTING CHECKING CIRCUITS, discloses a system wherein pairs of self-testing logic variables are utilized to monitor the correct operation of a computing system.

BACKGROUND OF THE INVENTION

As present day electronic computing systems become increasingly complex and sophisticated, the numbers of circuits within these computers has increased to gigantic proportions. This increase in overall size is coupled with a concurrent reduction in the time required for performing computations therein. With such large increases in the total numbers of circuits in today's modern complex computers, it will be apparent that the number of locations at which an error or fault can occur has greatly increased. Further, if a particular faulty component is producing incorrect data, a great many errors or incorrect computations can be produced within a very short space of time until the fault is detected and corrected.

Errors may occur at any given point in a computing system, such as in the logical circuitry, ranging from simple switching gates to even the internal connecting cables coupling various components of the system together wherein a poor contact can cause a hard or even intermittent failure. A particular area in a computer which requires considerable testing is that of the computer memory; the memory is the source of both data and instructions. Due to the complexity of most computer memories, including the various addressing circuitry components, memory decoders, drivers, sense networks, amplifiers, etc., there are many possible locations in which a failure can occur. Further, a failure in this area can result in an error which will be propagated to any and all subsequent portions of the computer where the data is used. Thus it is of great importance to insure proper memory operation on either read or write access.

In the above-referenced copending application Ser. No. 125,652, a system is disclosed which continuously checks the operation of the memory on every memory access. Further, the checking circuitry itself is designed to be self checking. That is to say that any single failure in the actual translation circuitry will automatically be detected so that incorrect data will not erroneously be supplied to the computer. However, as will be appreciated, memory operation is only one of the areas in which error free operation and thus, essentially fail-safe error detection, should optimally be provided wherever possible.

A number of schemes have been used in the past to indicate the existence of faulty binary data in electronic computers. The most commonly used scheme involves the use of one or more parity bits. The simplest is a single parity bit scheme wherein the parity bit may be set to a one or zero depending upon the character of the data which it accompanies. In some systems, it may be desired to set all parities equal to an even number of ones. Thus, if the data contains an odd number of ones, the parity bit would be chosen to be a one so that the total number of bits in the transmitted data word would always be an even number of ones. The same scheme may equally well be used to always insure that the total number of ones in the transmitted data word are odd. As this concept applies to memory operations, a parity bit may be included with the address and also with each data word stored in the memory. Thus, parity of the address may be checked and parity of the data word may be checked after read out.

Further, many other complex schemes for both detecting and correcting data errors such as Hamming Codes, etc., are well known in the computer arts.

However, when any of the above-referenced error detection and/or correction techniques are used, circuitry must be provided for actually detecting the errors and also for isolating just what portion of a computer is operating with a failed component when such an error is detected. This problem is addressed in the previously referenced copending application, Ser. No. 837,596, of Carter and Schneider. In this case, a series of line pairs emanate from the various checking circuits and these line pairs, depending on their content, will indicate "error free" or "error" conditions. However, as will be appreciated in any large scale computer, the various error detection circuits and functions are in essence cascaded down through many levels of error checking circuits wherein the error checking and detection circuitry must in itself be designed so as not to erroneously mask a previous error signal. This latter copending application additionally references several other copending applications wherein the function of error checking to produce line pair outputs is achieved. These line pair checking signals are often referred to as "self-testing logic variables (STLV)." Copending application Ser. No. 837,596 now U.S. Pat. No. 3,634,665 utilizes these STLVs in a particular way to produce an error indication by the use of a series of RCCO blocks which are in effect a type of morphic AND circuit. It should be noted that "morphic" will be explained and described subsequently as it applies to the present invention.

While the circuitry of the above-referenced copending application is able to accumulate error data from such incoming pairs of self-testing logic variables, the particular logic power of such a circuit which is as stated previously, essentially a morphic AND, is limited. For example, in copending application Ser. No. 125,652 of Carter, Henle, Jessep and Wadia, entitled ERROR-FREE DECODING FOR FAILURE-TOLERANT MEMORIES, a modified (a morphic NOT is used with it) Exclusive-OR function is required to determine the nature of a particular type of memory error which has been detected.

SUMMARY AND OBJECTS

It has now been found that a valuable addition to the field of error detection is provided by a novel morphic Exclusive-OR block which in its most basic form receives pairs of morphic self-testing logic variables and produces an output in accordance with the input patterns which will be specified subsequently. Further, this circuit is designed so that a failure of any component of the circuit will automatically produce an error indication in the output so that it will not be possible for an error indication on the input to the circuit to be masked by erroneous operation of the circuit itself. Further, combining of this circuit with morphic AND circuit referred to above, provides valuable logic functions allowing the design of more flexible error detection systems to be utilized with complex modern computers.

It is accordingly a primary object of the present invention to provide a logic circuit capable of performing the morphic Exclusive-OR function.

It is further object to provide such a circuit which is itself self testing such that a detectable error signal will be produced if the circuit itself malfunctions.

It is a still further object to produce such a circuit utilizing conventional logic building blocks such as conventional logic gates such as ANDs, ORs and inverters.

It is a still further object to provide such a logic circuit which may be expanded to receive any desired number of self-testing logic variable pairs of morphic variable inputs.

Other objects, features and advantages of the invention will be apparent from the following more particular description of preferred embodiments of the invention as illustrated in the accompanying drawings.

DESCRIPTION OF THE INVENTION

The objects of the present invention are accomplished in general by a morphic Exclusive-OR circuit having as inputs at least two pairs of morphic operators and having as an output a single pair of morphic operators, said circuit including means for providing a Code Space output when one and only one pair of morphic operators at the input is in Code Space and the other pair of inputs is in Error Space and providing an Error Space output when both inputs are in Code Space or Error Space.

Code Space (CS) and Error Space (ES) may be selectively chosen from a first condition wherein a given line pair or morphic variable pair will carry a 01 or a 10 binary signal and a second condition wherein a line pair or morphic variable pair will carry a 00 or a 11 binary signal, wherein if one condition represents Error Space, the other condition will represent Code Space.

It should be understood that the terms "Code Space" and "Error Space" are used as a convenient way to express code conditions and are not intended to be otherwise limiting. The terminology arises from the application of testing techniques discussed in the previously related two copending applications wherein a given condition on a line pair from some testing circuit indicates that everything is operating properly and the other condition implies that an "Error" is present, either in the circuitry or in the data being tested. It should also be noted that, in some usage and implementation, the definition of CS by 01 and 10 (and ES by 00 and 11) will be changed to represent CS by 00 and 11 (and ES by 01 and 10). The definitions above will be preserved consistently throughout this treatment.

The present morphic Exclusive-OR circuit is quite simple in concept but is believed to be novel since no use for morphic operators as defined herein was believed to exist before the recent advent of self-testing error detection systems.

The present morphic Exclusive-OR circuit is also self-testing in that, in the event of an internal circuit failure, a change from one code condition to the other in the output will be produced by this circuit.

Figure 1:
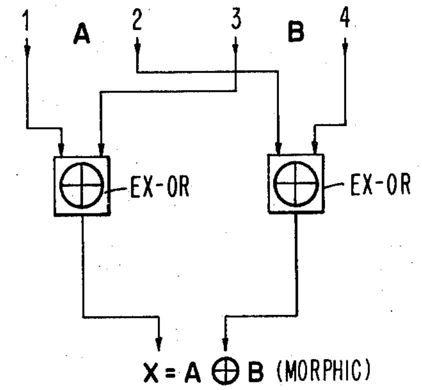
FIG. 1 is a logical schematic diagram of a first embodiment of a two input pair morphic Exclusive-OR circuit constructed in accordance with the teachings of the present invention.
Figure 2:
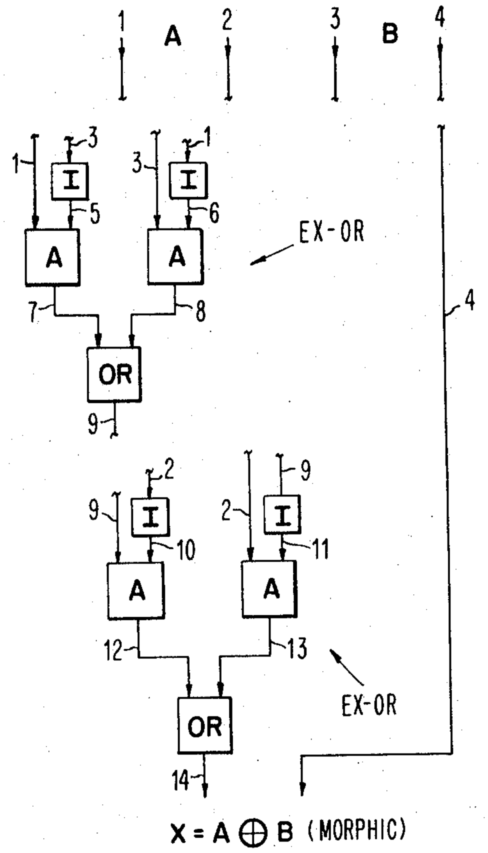
FIG. 2 is a logical schematic diagram of a two input pair morphic Exclusive-OR circuit constructed in accordance with the principles of the present invention.
Figure 3:
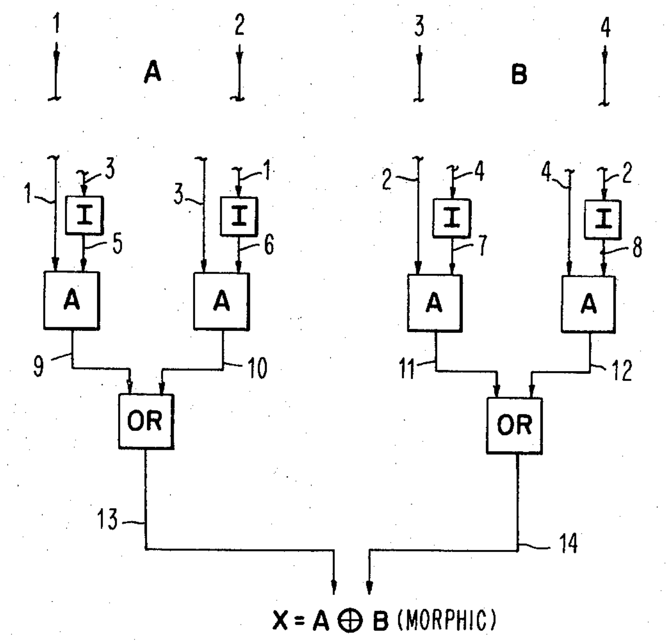
FIG. 3 is a more detailed logical schematic diagram of the morphic Exclusive-OR block shown in FIG. 1.

Referring now to the Figures, the invention will be explained with reference to the disclosed embodiments. In FIG. 1, there is shown the simplest version of the invention wherein the two pairs of morphic operator inputs A and B feed into the two indicated Exclusive-OR circuits and produce a single output pair. It will be noted that each of these Exclusive-OR circuits is a simple two input, single output Exclusive-OR and at first glance appears like a first level of a four input conventional Exclusive-OR tree. However, here the resemblance ends as it will be noted that one of the Exclusive-ORs takes an input from the input pair A and a second input from the input pair B. The other Exclusive-OR does the same thing. Further, the output of the circuit is a binary pair rather than a single line. Thus, both the input and the output comprise morphic operators or pairs of self-testing logic variables. The truth tables would also be quite different. FIG. 3 comprises a detailed logical schematic diagram of the circuit of FIG. 1 which is embodied utilizing simple AND, OR and Inverter stages. Further, a complete Truth Table and Test Detect Table III is presented showing exactly how the circuit works with various conditions of inputs and also illustrating the self-testability feature. FIG. 2 comprises an alternative embodiment of the two input single output morphic Exclusive-OR circuit constructed in accordance with the principles of the invention. It will be noticed that in this embodiment one circuit path comprises approximately twice as many levels of logic. This configuration of the morphic Exclusive-OR is dependent on the Algorithm required to obtain the self-testing structure. For example, for one particular Algorithm, the configuration of FIG. 1 will not necessarily give a self-testing structure in multilayer circuits but the configuration of FIG. 2 will.

FIG. 3 comprises a detailed logical schematic diagram of the morphic Exclusive-OR circuit which is shown at a higher level of logical representation in FIG.

Figures it will be apparent that points 1, 2, 3 and 4 are the inputs. For a detailed description of the "Test Detect" algorithm, reference is made to an article by W.G. Bouricius et al entitled "Interacting Design of Self-Testing Circuitry," Purdue Centennial Year Symposium, April, 1969. A further article describing how a program may be written to generate a particular Test Detect table for a given logical circuit is generally described in an article by J.P. Roth et al entitled "Programmed Algorithms to Compute Tests to Detect and Distinguish between Failures in Logic Circuits," IEEE Transactions on Electronic Computers, Vol. EC-16, No. 5, October 1967 on pages 567–580. The first paper gives a rather detailed description of the concept of self-testability, while the second discusses the broader use of Test Detect.

TABLE II

| INPUTS A B | TEST DETECT | TRUTH TABLE X |
|---|---|---|
| | 11111 | 1 |
| 1234 | 12345678901234 | 4 4 |
| | CS = CS = ES | |
| 0101 | 1010 111 0 00 | 1 1 |
| 0110 | 1001 0 0011111 | 0 0 |
| 1001 | 01100 0 00 0 0 | 1 1 |
| 1010 | 010111111 111 | 0 0 |
| | CS + ES = CS | |
| 0100 | 1011 111 0 00 | 0 1 |
| 0111 | 1000 0 0011111 | 1 0 |
| 1000 | 01110 0 00 0 0 | 0 1 |
| 1011 | 010011111 111 | 1 0 |
| | ES + CS = CS | |
| 0001 | 1110 111 111 | 1 0 |
| 0010 | 1101 0 000 0 0 | 0 1 |
| 1101 | 00100 0 011111 | 1 0 |
| 1110 | 000111111 0 00 | 0 1 |
| | ES + ES = ES | |
| 0000 | 1111 111 111 | 0 0 |
| 0011 | 1100 0 000 0 0 | 1 1 |
| 1100 | 00110 0 011111 | 0 0 |
| 1111 | 000011111 0 00 | 1 1 |

TABLE III

| INPUTS A B | TEST DETECT | TRUTH TABLE X |
|---|---|---|
| | 11111 | 1 1 |
| 1234 | 12345678901234 | 3 4 |
| | CS = CS = ES | |
| 0101 | 1010 11111111 | 0 0 |
| 0110 | 1001 00 00 00 | 1 1 |
| 1001 | 01100 00 000 | 1 1 |
| 1010 | 010111 111111 | 0 0 |
| | CS + ES = CS | |
| 0100 | 1011 0 110 10 | 0 1 |
| 0111 | 1000 011 01101 | 1 0 |
| 1000 | 01110 0 1101 | 1 0 |
| 1011 | 010011 011 010 | 0 1 |
| | ES + CS = CS | |
| 0001 | 1110 011 010 | 0 1 |
| 0010 | 1101 0 01101 | 1 0 |
| 1101 | 00100 110 1101 | 1 0 |
| 1110 | 0001110 110 10 | 0 1 |
| | ES + ES = ES | |
| 0000 | 1111 111111 | 0 0 |
| 0011 | 1100 0 0 0 000 | 1 1 |
| 1100 | 00110 0 0 0 00 | 1 1 |
| 1111 | 00001111111111 | 0 0 |

However, for a general description of what the Test Detect portion of FIGS. 2 and 3 shows, it will be observed that each of the lines emanating from each logical block of the circuit is labelled with a number. It will, of course, be apparent in such standard logic circuitry that with some hypothetical failure, it is possible for any one of these points to be stuck-at a 1 or a 0. What the table shows is that for the given morphic variable pair of inputs looking at the left-hand portion of the table, that pair of inputs will in effect cause a test to be made of the particular points on the same row of the Test Detect table. Thus, looking at row 1 of Table II, with an input configuration 01, 01, this will cause the lines 1, 2, 3 and 4 to be tested for stuck-at conditions of 1,0,1,0 respectively. Similarly, positions 7, 8 and 9 are effectively tested for the condition stuck-at 1 and positions 11, 13 and 14 are tested for stuck-at 0. By "tested for," it is meant that if one (and only one) circuit should fail at the indicated stuck-at position, one of the output lines, i.e., 4 or 14 in the Truth Table portion of Table II would have its value changed. It will be noted that in row 1 of Table II, locations 5, 6, 10 and 12 contain blanks. What this means is that with the given input data configuration that line in these locations would not affect the output one way or the other regardless of whether they were stuck at a 1 or a 0. What the table as a whole indicates about the particular circuit is that with each set of four possible input patterns, it will be noticed that in every column of the Test Detect portion of the table there is at least one binary 1 and at least one binary 0. This means that within the allowable code configuration depicted by a set of four input patterns, every position of these circuits is tested. If, for example, one of the columns had been all blank, it would mean that there is no code configuration that would really have tested that location or conversely, if the particular column contained only ones or only zeros, the opposite condition would never be tested for. It should be noted in passing that the expression "self-testing" in this instance means that there are allowable input patterns for the circuit which will cause a change in the output (permitting detection) for each and every circuit (stuck-at-1 or stuck-at-0 failure) in the overall logic circuit. It should also be noted that if a "stuck-at" condition results in the proper operation of the overall circuit, there will not be an error produced. In other words, if an AND circuit is stuck-at-1 but, due to its logical inputs, it should be producing a 1, it would be apparent that no error would be caused in this case. Thus, the circuit would be considered to be working properly insofar as testability is concerned. It is not believed that this advantage in certain types of logic circuitry has been recognized in the past and it should be understood that this is what was meant by self-testing in the context of the present application.

Figure 4:
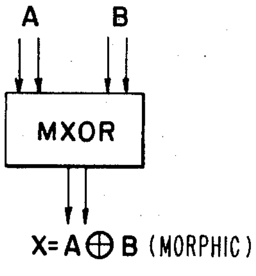
FIG. 4 illustrates a diagramatic representation of a two input pair morphic Exclusive-OR circuit (MXOR) shown in FIGS. 5 and 6.
Figure 5:
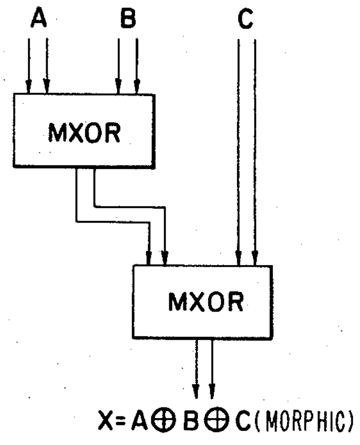
FIG. 5 is a logic block diagram of a three input pair morphic Exclusive-OR circuit.
Figure 6:
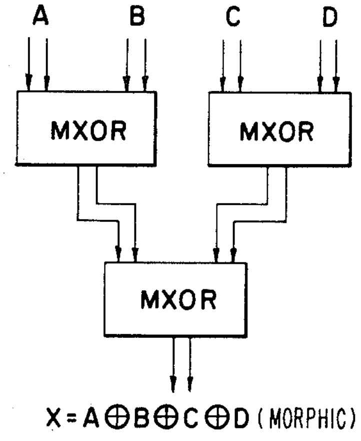
FIG. 6 is a logic block diagram of a four input pair morphic Exclusive-OR circuit.

Referring now to FIGS. 4, 5 and 6, the functional block diagram of FIG. 4 indicated as MXOR, could be filled by either the particular circuit embodiment of FIGS. 2 or 3 as it is used in the functional context only. It applies to the way that such a morphic Exclusive-OR could be utilized in a larger configuration such as in FIGS. 5 and 6. These two FIGS. are essentially the same showing three and four morphic variable pairs respectively and indicating the conventional way that such basic MXOR blocks would be connected to make the indicated logical test.

As will be appreciated with the circuits of FIGS. 5 and 6, the Code Space output would be produced at X for odd numbers of Code Space inputs, i.e., 1 or 3. This, of course, is analogous to the case of conventional Exclusive-OR circuitry used to determine parity of a set of bits. It will, of course, be appreciated that the basic 1. The embodiment of the individual Exclusive-OR circuits in FIG. 3 is the same as that in FIG. 2 as will be apparent. Again, the output of the embodiment of FIG. 3 is a line pair or morphic variable pair.

Before proceeding with the description of the logic functions for the basic morphic Exclusive-OR circuits as shown in the specific embodiments of FIGS. 2 and 3, there will follow a brief description of what is meant by a morphic operator in the context of the present invention. As stated in the background section of the specification, wherein reference was made to the two copending applications, it was stated that it has been found that for optimum self-testability in error detection systems, single lines must be replaced with line pairs. This necessary condition for self-testability requires that the passive lines (lines which during normal operation take on only one of the values 0, 1) be replaced by a pair of lines, both of which during normal operation take on values of 0 and 1. There do exist then, two natural correspondences between the values taken by the new pair and the values taken by the single passive line viz.

$$M: ((e_1,e_2),(e_1',e_2')) \mapsto 1$$

$$((e_1,e_2'),(e_1',e_2)) \mapsto 0$$

where $e_1, e_2$ are members of the groups {0, 1}. These correspondences are known mathematically as Morphisms.

Once the constant value single line is replaced by a testable pair, it becomes imperative to implement Boolean functions of these lines. Combining the pairs back to single lines and realizing the ordinary Boolean function, defeats the purpose as once again single lines with constant values during normal operation result with the effect that it is difficult to tell if they are in a "-stuck-at" condition. According to the present definition of morphic variables, the pair of lines may assume either of two conditions. The first is where the signal appearing on the two lines is different, i.e., 01 or 10. The second condition is that where the signal appearing on the two lines is identical, i.e., 00 or 11.

These two conditions may be arbitrarily referred to as CS or ES. However, these designations can just as easily be reversed. It may thus readily be seen that the characteristics of morphic variables and the requirements of the morphic logic circuitry for handling them are quite different from simple two rail logic (although ordinary logic is used to implement the morphic logic function) wherein for example, a 01 represents a 0 and a 10 represents *a* 1. Thus, a two rail Exclusive-OR circuit would operate quite differently and have quite a different Truth Table from the presently disclosed morphic Exclusive-OR circuit. The disclosed morphic Exclusive-OR circuit is designed specifically for the purpose of performing the morphic Exclusive-OR function which will be more apparent subsequently with the aid of the Truth Table and further. It is also necessary that the morphic Exclusive-OR circuit be essentially self-testing when located in an overall self-testing error checking system. The present morphic Exclusive-OR circuit is considered to be one significant member of a "universal self-testing set" of morphic operator blocks (the other being the morphic AND) by which it is meant that utilizing said universal set there exists an algorithm for interconnecting said blocks so as to give a self-testing implementation for any desired morphic Boolean function.

Returning now to the description of the disclosed embodiments whose operation will be described with the aid of Tables I, II, and III, it is assumed for the sake of illustration and discussion that whenever a line pair, i.e., one of the inputs A or B or one of the outputs X contains the binary configuration 01, 10, the line pair is said to be in Code Space. Conversely, when the line pair assumes the condition 00, 11, it is said to be in Error Space. By definition, the morphic Exclusive-OR function results in a Code Space output from a two input morphic Exclusive-OR block when the inputs are in Code Space and one of the inputs is in Error Space. Conversely, when both inputs are either in Code Space or in Error Space, an Error Space output will result. This is illustrated for the sake of clarity in Table I. An analogous definition from the CS and ES viewpoint could be used to explain other morphic operators, such as the morphic AND (MAND), morphic NOT (M-NOT), etc.

TABLE I

| Inputs | | Output |
|---|---|---|
| A | B | X |
| CS | CS | ES |
| CS | ES | CS |
| ES | CS | CS |
| ES | ES | ES |

The actual operation of the specific circuits of FIGS. 2 and 3 is set forth in Tables II and III respectively. These two tables are identical in form and differ only in the specified points in the circuits to which they refer. Both of these tables are what would be referred to as a combination Test Detect Table and a Truth Table. They are combined for the sake of convenience since all possible inputs are required for both portions of the table. It will be further noted that the input configurations are clearly indicated in the left-hand or Input portion of the table which, as indicated, include the two input pairs A and B, thus corresponding to the drawings. Similarly, the output pair is labeled X. Both tables are also broken into four distinct sections depending on the input code configuration. Thus, the first section in each table has two CS inputs to produce an ES output. Section two receives a CS and ES input to produce CS output. Section three has an ES input and a CS input and thus produces a CS output and finally, section four of each table has an ES and an ES input to produce an ES output. As stated previously in both of these tables, the pair 01, 10 is designated as Code Space and the pair 00, 11 is denoted as Error Space.

It is believed that the contents of the Truth Table are self explanatory and inspection by propagating the specified input on any one line down through the logic circuitry of either FIGS. 2 or 3 will produce the specified output at X as indicated in both tables.

The Test Detect portion of Tables II and III is designed to show that the circuit is testable for "stuck-at" failures at all of the testing points shown in the two Figures, i.e., points 1 through 14, wherein in both MXOR blocks could be cascaded into trees as shown in FIG. 6 to accomodate any number of desired morphic variable pairs on which it was desired to perform an Exclusive-OR operation.

The description of FIGS. 4, 5 and 6 completes the description of the basic concepts embodied in the present invention. It is believed that the present morphic Exclusive-OR circuit, while simple and straightforward in configuration, nevertheless performs a logic function not known in the art prior to the present application. The provision of such a basic operating block for performing Boolean logic on morphic operators is believed to have significant utility in the error detection and error correction fields.

It should be understood that the intrinsic worth of the Morphic Exclusive-OR (MXOR) is in its use, in conjunction with the Morphic AND (MAND) operation, to form a universal set of morphic self-testing logic operators. These operators may be used to form morphic self-testing logic functions of the input variables, morphic self-testing variables. These variables normally arise in a digital computer when interface error checking is performed by self-testing checkers; the outputs of these checkers, as shown in the copending application Ser. No. 125,652, of Carter, Henle, Jessep and Wadia, are morphic self-testing variables which, under proper interpretation, indicate not only manifestations of functional failures (the ability of the unit being checked to function properly) but checker failures (a circuit failure in the checking circuit itself). Hence, it becomes necessary to discern between the detection of a functional failure and the detection of a checker failure. This constitutes a proof of the validity of the conventional logic variables being checked; it is important to know, in the initiation of recovery processes, whether the unit has failed functionally, and this has been detected, or if the checker itself has failed and the functional capabilities of the checked unit are unimpaired. The ability to make this distinction can be implemented in self-testing hardware by the use of the morphic operator being disclosed in conjunction with the MAND. It is achieved by forming (morphic, self-testing) logic functions of carefully selected (morphic, self-testing) variables in the general case. A specific example follows.

The example is drawn from the copending application Ser. No. 125,652 of Carter, Henle, Jessep and Wadia, in which a modified MXOR, as mentioned previously, is used to test two (morphic, self-testing) logic variables R and P and the (morphic, self-testing) output of the modified MXOR is referred to as Q. The testing circuit uses an MXOR having a morphic complement function performed on its outputs; hence, the output space definition is reversed so that the output of the testing circuit has an ES output whenever precisely one of the inputs, R and P, are in Error Space. This may be used to indicate either a double error detected in the output data word (the manifestation of a functional failure of the memory unit) or a failure in the circuitry producing Q (a failure in the checking circuit), including the circuitry used to produce R and P. To show how morphic self-testing logic functions can be used, then, assume that it would be desirable to test the circuitry forming Q, assuming R and P are correct, so as to distinguish between a double error in a word read out of memory and a failure in the circuitry producing Q. This is done by forming a new morphic self-testing function using R, P and Q as inputs. The new, morphic self-testing function Z is defined by $$Z = R \oplus_M P \oplus_M (\approx_M Q)$$

where $\oplus_M$ and $\approx_M$ are the symbols for the MXOR and morphic NOT. Hence, Z will have an ES output anytime the inputs to the circuit producing Q are not space-wise consistent with the output state for Q. Otherwise, Z will have a CS status. While it is true that this is almost duplication, no comparator is used and the comparison is done in a self-testing fashion. Hence, a circuit failure in the circuit producing Q can be uniquely identified.

There is one major point to be made on the effective and efficient use of morphic operators and functions used in implementing self-testing functions. The precise mathematical definition of the morphism concept has been previously introduced; hence, the notion of morphic operator and self-testing morphic blocks, as a means to implementation of the morphic operators (MXOR, MAND) has been explained. Consider then, that it is desired to implement a function defined in its conventional Boolean form symbolically as $f(a_1,a_2, \ldots ,a_n,\Lambda V,\approx)$, where $a_1 a_2 \ldots) a_n$ are $n$ input variables and $\Lambda,V,\approx$ are ordinary Boolean operators AND, OR, and NOT and further that the inputs are semipassive. Suppose further, that $f$ is multi-level in its gate structure, if it were to be implemented by ordinary logic gates. Then, if it is desired to implement this in a self-testing logic form, each input variable, $a_i$, would be replaced by a variable pair, $(a_{i0}, a_{i1})$. However, this would not alone necessarily provide a self-testing form; in multilevel circuitry, the design of self-testing functions without the use of morphic operators is a very precarious process, usually requiring much iterative design and evaluation by a circuit simulator. In multilevel circuits, there is a high probability that the failed condition of a logic gate (output stuck hard at 1 or 0) will be masked by other (correct) logic conditions within the same circuit; hence, the error goes undetected and may eventually permute correct outputs to incorrect inputs. Design of a self-testing circuit without resorting to an encoding of the variables as above ($a_i$ replaced by $(a_{i0},a_i)$) is even more difficult. Hence, to provide the greatest possible simplicity of encoding and implementation, as well as positive assurance that the logic circuit providing the function will be in self-testing form, the designer should use the MXOR, the MAND, and specific implementation algorithms, as well as the encoding above. Thus, the function $f(a_1,a_2, \ldots a_n,\Lambda,V,\approx)$ would become $F(a_{10},a_{11},a_{20},a_{21}, \ldots ,a_{n0}, a_{n1}$,MX-OR,MAND). As an example, if $(f_1, f_2)$ is a particular self-testing embodiment, the embodiment $(\overline{f_1+f_2})$ is likewise a self-testing embodiment for morphic Boolean functions.

While the invention has been particularly shown and described with reference to preferred embodiments thereof, it will be understood by those skilled in the art that various changes in form and details may be made therein without departing from the spirit and scope of the invention.

What is claimed is:

1. A morphic self-testing Exclusive-OR circuit having as inputs two morphic variable pairs and having as an output a single morphic variable pair, said circuit including means for producing a first output code condition when one and only one input morphic variable pair is in said first code condition and the other input morphic variable pair is in a second code condition and means for producing a second output code condition when both morphic variable input pairs are in said first code condition or both are in said second code condition wherein said first and second code conditions are selectively chosen from a first state wherein a given morphic variable pair comprises a 01 or a 10 binary signal and a second state wherein a morphic variable pair comprises a 00 or a 11 binary signal, wherein if one state represents said first code condition, the other state represents the second code condition.

2. A morphic Exclusive-OR circuit as set forth in claim 1 wherein said morphic Exclusive-OR circuit comprises two, two input single output binary Exclusive-OR circuits, means for connecting one input from each input morphic variable pair to the two inputs of the first binary Exclusive-OR circuit and at least one input not previously used from one of said morphic variable pairs to one input of the second binary Exclusive-OR circuit and wherein the output of at least the second binary Exclusive-OR circuit forms one member of the output morphic variable pair.

3. A morphic Exclusive-OR circuit as set forth in claim 2 including means for connecting the other said second Exclusive-OR circuit inputs from each of said morphic variable pairs to said second Exclusive-OR circuit and means for taking the outputs from said two binary Exclusive-OR circuits to provide the output morphic variable pair for said morphic Exclusive-OR.

4. A morphic Exclusive-OR circuit as set forth in claim 3 wherein each binary Exclusive-OR comprises two, two input AND circuits, each AND circuit having as its input the true and inverted signal appearing on the two input lines to said binary Exclusive-OR circuit and the other AND circuit having as its inputs the inverted and the true input signals appearing on the two input lines to said binary Exclusive-OR circuit, the outputs of said two AND circuits being fed to a binary OR circuit, the output of said OR circuit comprising the single line output of said binary Exclusive-OR.

5. A morphic Exclusive-OR circuit as set forth in claim 2 including means for connecting to said second binary EXclusive-OR circuit the output of said first binary Exclusive-OR and the other input of a first of said morphic variable input pairs, and means for connecting the other input of said second morphic variable input pair directly to the output line of said morphic Exclusive-OR circuit and for connecting the single output from said second binary Exclusive-OR circuit to the other output line of said morphic Exclusive-OR circuit.

6. A morphic Exclusive-OR circuit as set forth in claim 5 wherein each binary Exclusive-OR comprises two, two input AND circuits, each AND circuit having as its input the true and inverted signal appearing on the two input lines to said binary Exclusive-OR circuit and the other AND circuit having as its input the inverted and the true input signals appearing on the two input lines to said binary Exclusive-OR circuit, the outputs of said two AND circuits being fed to a binary OR circuit, the output of said OR circuit comprising the single line output of said binary Exclusive-OR.

7. A morphic Exclusive-OR system for performing a morphic Exclusive-OR function on M morphic variable input pairs, said circuit being comprised of M-1 individual two input morphic Exclusive-OR blocks, said blocks being connected to said M morphic variable input pairs so that two morphic variable input pairs are connected to each block and a single morphic variable output pair is produced by each said block, said blocks being connected in a tree circuit configuration to produce a single morphic variable output pair from said M morphic variable input pairs and wherein each individual block comprises an individual morphic Exclusive-OR circuit including means for producing a first output code condition when one and only one input morphic variable pair is in said first code condition and the other input morphic variable pair is in a second code condition and means for producing a second output code condition when both morphic variable input pairs are in said first code condition or both are in said second code condition wherein said first and second code conditions are selectively chosen from a first state wherein a given morphic variable pair comprise a 01 or a 10 binary signal and a second state wherein a morphic variable pair comprises a 00 or a 11 binary signal, wherein if one state represents said first code condition, the other state represents the second code condition.

* * * * *